(12) United States Patent
Pawar et al.

(10) Patent No.: US 11,368,265 B2
(45) Date of Patent: Jun. 21, 2022

(54) CSI-RS SEQUENCE GENERATION AND MAPPING AND DMRS SCRAMBLING ID CONFIGURATION

(71) Applicant: APPLE INC., Cupertino, CA (US)

(72) Inventors: Sameer Pawar, Santa Clara, CA (US); Avik Sengupta, San Jose, CA (US); Alexei Davydov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/407,743

(22) Filed: May 9, 2019

(65) Prior Publication Data

US 2019/0327050 A1 Oct. 24, 2019

Related U.S. Application Data

(63) Continuation of application No. 16/247,171, filed on Jan. 14, 2019, now abandoned.

(51) Int. Cl.

| | | |
|---|---|---|
| *H04W 4/00* | (2018.01) | |
| *H04L 5/00* | (2006.01) | |
| *H04W 72/12* | (2009.01) | |
| *H04L 27/20* | (2006.01) | |
| *H04B 7/02* | (2018.01) | |
| *H04L 25/02* | (2006.01) | |
| *H04L 27/26* | (2006.01) | |
| *H04W 88/02* | (2009.01) | |

(52) U.S. Cl.
CPC ............ *H04L 5/0048* (2013.01); *H04B 7/02* (2013.01); *H04L 5/0094* (2013.01); *H04L 25/0226* (2013.01); *H04L 27/20* (2013.01); *H04L 27/2613* (2013.01); *H04W 72/1263* (2013.01); *H04L 5/0007* (2013.01); *H04W 88/02* (2013.01)

(58) Field of Classification Search
None
See application file for complete search history.

(56) References Cited

U.S. PATENT DOCUMENTS

| | | | | |
|---|---|---|---|---|
| 2012/0307768 | A1* | 12/2012 | Xu | ............... H04L 5/0023 370/329 |
| 2013/0034064 | A1* | 2/2013 | Nam | ............... H04L 5/0091 370/329 |
| 2013/0039284 | A1* | 2/2013 | Marinier | ............... H04L 5/001 370/329 |
| 2013/0178220 | A1* | 7/2013 | Lee | ............... H04L 5/0007 455/450 |

(Continued)

*Primary Examiner* — Clemence S Han
(74) *Attorney, Agent, or Firm* — Fay Kaplun & Marcin, LLP

(57) ABSTRACT

In some embodiments, an apparatus of a Fifth Generation (5G) NodeB (gNB) comprises one or more baseband processors to encode one or more channel state information reference signals (CSI-RS) to be transmitted to a user equipment (UE). The one or more CSI-RS signals comprise a complex sequence mapped to a resource element (RE) such that all CSI-RS ports use an identical sequence for the one or more CSI-RS signals in a symbol. In other embodiments, the gNB comprises one or more baseband processors to encode a scrambling identity (ID) configuration for one or more demodulation reference signals (DMRS), wherein the scrambling ID configuration indicates one of two scrambling IDs to be signaled to a UE.

18 Claims, 5 Drawing Sheets

(56) References Cited

U.S. PATENT DOCUMENTS

| | | | |
|---|---|---|---|
| 2013/0196675 A1* | 8/2013 | Xiao | H04B 17/24 455/452.1 |
| 2014/0086093 A1* | 3/2014 | Liu | H04W 24/02 370/252 |
| 2014/0153488 A1* | 6/2014 | Koivisto | H04B 1/10 370/328 |
| 2016/0227521 A1* | 8/2016 | Han | H04L 5/0051 |
| 2017/0230135 A1* | 8/2017 | Oh | H04J 11/00 |
| 2018/0270799 A1* | 9/2018 | Noh | H04L 5/0094 |
| 2019/0013910 A1* | 1/2019 | Zhang | H04B 7/0452 |
| 2019/0222284 A1* | 7/2019 | Huang | H04L 5/0048 |
| 2019/0296876 A1* | 9/2019 | Zhang | H04L 5/0023 |
| 2019/0320457 A1* | 10/2019 | Maaref | H04L 1/0045 |
| 2019/0342907 A1* | 11/2019 | Huang | H04L 5/0091 |
| 2021/0119836 A1* | 4/2021 | Ge | H04W 72/042 |

\* cited by examiner

CSI-RS SEQUENCE GENERATION AND MAPPING AND DMRS SCRAMBLING ID CONFIGURATION

CROSS REFERENCE TO RELATED APPLICATIONS

This application is a continuation of U.S. application Ser. No. 16/247,171 filed Jan. 14, 2019, entitled CSI-RS SEQUENCE GENERATION AND MAPPING AND DMRS SCRAMBLING ID CONFIGURATION. Said application Ser. No. 16/247,171 is hereby incorporated by reference in its entirety.

BACKGROUND

In radio systems, a multiple-input, multiple-output (MIMO) system relies on a plurality of transmit (Tx) antennas and receive (Rx) antennas to provide spatial diversity, multiplexing, and array gains in the downlink and uplink channels. In the downlink, the transmitter can increase the performance by using channel state information (CSI) about the downlink channel observed by the receiver. The CSI can be obtained by the transmitter from the receiver from an estimation of the uplink channel and by using channel reciprocity of the wireless channel, or from quantized feedback measured by the receiver.

A channel state information reference signal (CSI-RS) is a reference signal that supports many functionalities in NR including channel measurement for CSI calculation. A demodulation reference signal (DMRS) is a user specific reference signal which can be used for channel estimation for physical downlink shared channel (PDSCH) and physical uplink shared channel (PUSCH) data demodulation. In Release 15 of the New Radio (NR) standard, a DMRS is generated using a length 31 Gold Sequence similar to the Long Term Evolution (LTE) standard. The initialization for the Gold sequence involves the configuration of a 16-bit user specific scrambling identifier ID in order to randomize interference and reduce cross-correlation between different DMRS sequences. In the NR standard, two such scrambling IDs can be configured per user.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
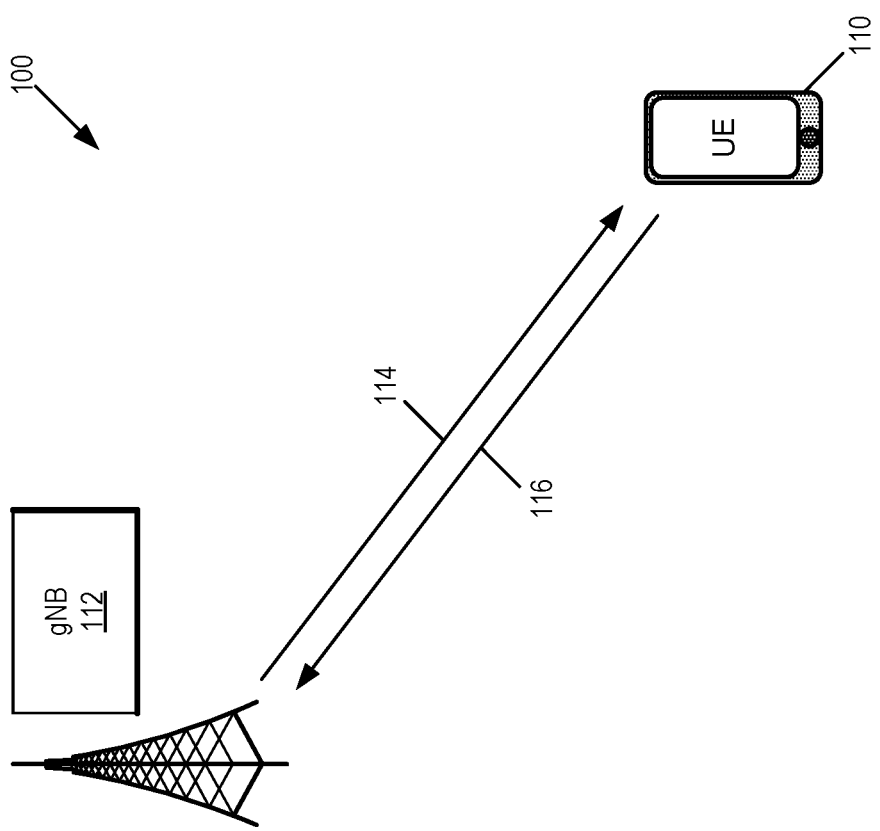
FIG. 1 is a diagram of a Fifth Generation (5G) New Radio (NR) access network in which channel state information reference signals (CSI-RS) may be utilized in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

Referring now to FIG. 1, a diagram of a Fifth Generation (5G) New Radio (NR) access network in which channel state information reference signals (CSI-RS) may be utilized in accordance with one or more embodiments will be discussed. As shown in FIG. 1, a Fifth Generation (5G) New Radio (NR) access network 100 may include a 5G NodeB (gNB) 112 to communicate with one or more user equipment (UE) devices 110 to receive messages and/or data in the downlink 114, and to send messages and/or data to gNB 112 in the uplink 116. In one or more embodiments, UE 110 may receive measurement configuration information such as MeasObjectNR from gNB 112 as a radio resource control (RRC) message in the downlink 114 to configure the UE 110 to perform Reference Signal Received Power (RSRP) or Reference Signal Received Quality (RSRQ) measurements on a neighbor or target cell (not shown) for example via channel state information reference signals (CSI-RS) transmitted by the neighbor or target cell 114. RSRP is the average power of resource elements (RE) that carrier cell specific Reference Signals (RS) over the entire bandwidth. RSRP is measured in the symbols that carry the cell specific Reference Signals (RS). The UE 110 measures the power of multiple resource elements (REs) that carry the Reference Signals (RS), and then averages the power over the measured REs.

In accordance with one or more embodiments, CSI-RS sequence generation and its mapping to the physical resource elements for NR is provided. The design utilized by access network 100 supports potentially more than one complex symbol per physical resource block orthogonal frequency-division multiplexing (OFDM) symbol while using the same sequence for all the CSI-RS ports in a symbol. The CSI-RS resources are described in New Radio Release 15 of the Third Generation Partnership Project (3GPP) in 3GPP Technical Specification (TS) 38.211V1.3.0 (2017-12) as follows.

1. CSI-RS-Resource

An X={1, 2, 4, 8, 12, 16, 24, 32} port CSI-RS resource is constructed from a combination of one or more CSI-RS components. A CSI-RS resource component in a PRB consists of adjacent Y resource elements in frequency and Z adjacent resource elements in time domain. The possible pairs of values of (Y, Z)={(2, 1), (4, 1), (2, 2)}. The possible combinations of CSI-RS resource components to make up an X port CSI-RS resource are described in Table 1. The time-domain locations $l_0$ and $l_1$ are defined relative to the starting positions of a CSI-RS resource within a slot $\bar{l} \in \{0, 1, \ldots, 13\}$ as configured by the higher-layer parameter. The frequency-domain location $k_i$ of the CSI-RS resource component is given by a bitmap provided by the higher-layer parameter. The values $k_i$ in Table 1 corresponds to the $i^{th}$ set bit in the bitmap, starting from $b_0$, with the bitmap and value of $k_i$ given by

[$b_3 \Lambda b_0$], $k_i = f(i)$ for row 1 of Table 1
[$b_{11} \Lambda b_0$], $k_i = f(i)$ for row 2 of Table 1
[$b_2 \Lambda b_0$], $k_i = 4 f(i)$ for row 4 of Table 1
[$b_5 \Lambda b_0$], $k = 2 f(i)$ for all other cases
where f(i) is the bit number of the $i^{th}$ set bit in the bitmap.

2. Sequence Generation

The UE shall assume the reference-signal sequence r(m) is defined by $$r(m) = \frac{1}{\sqrt{2}}(1 - 2 \cdot c(2m)) + j\frac{1}{\sqrt{2}}(1 - 2 \cdot c(2m+1)).$$

where the pseudo-random sequence c(i) is defined in clause 5.2.1 [1]. The pseudo-random sequence generator shall be initialized with $c_{init} = (2^{10} \cdot (14 n_{s,f} + l + 1)(2 n_{ID} + 1) + n_{ID}) \bmod 2^{31}$ at the start of each OFDM symbol where $n_{s,f}$ is the slot number within a radio frame, l is the OFDM symbol number within a slot, and $n_{ID}$ equals the higher-layer parameter ScramblingID.

In addition to the above CSI-RS details reviewed from the NR Rel-15, we have agreement from 3GPP RAN1 meeting #91 [2] that CSI-RS sequence, for one OFDM symbol, is same for all the ports and supports more than one complex symbol per PRB per symbol. Considering these constraints, we propose a following RE mapping of CSI-RS sequences.

For X=1, port CSI-RS resource, $a_{k,j}^{(p,\mu)} = \beta_{CSIRS} w_f(k') \cdot w_t(l') \cdot r(m')$ $k = \bar{k} + k' + 12 m'$ $l = \bar{l} + l'$ For X>1, port CSI-RS resource, $a_{k,j}^{(p,\mu)} = \beta_{CSIRS} w_f(k') \cdot w_t(l') \cdot r(m')$ $k = \bar{k} + k' + 12 m'$ $l = \bar{l} + l'$ Where m' are integers corresponding to the occupied PRBs. The UE shall assume $\beta_{CSIRS} > 0$ for a non-zero-power CSI-RS where $\beta_{CSIRS}$ is selected such that the power offset specified by the higher-layer parameter, if provided, is fulfilled. The quantities $\bar{k}$, k', l', $w_f(k')$, and $w_t(l')$ are given by Table 1 through Table 5, below.

TABLE 1

CSI-RS locations within a slot.

| Row | Ports | Density ρ | CDMtype | ($\bar{k}$, $\bar{l}$) | k' | l' |
|---|---|---|---|---|---|---|
| 1 | 1 | 3 | No CDM | ($k_0$, $l_0$), ($k_0 + 4$, $l_0$), ($k_0 + 8$, $l_0$) | 0 | 0 |
| 2 | 1 | 1, 0.5 | No CDM | ($k_0$, $l_0$) | 0 | 0 |
| 3 | 2 | 1, 0.5 | FD-CDM2 | ($k_0$, $l_0$) | 0, 1 | 0 |
| 4 | 4 | 1 | FD-CDM2 | ($k_0$, $l_0$), ($k_0 + 2$, $l_0$) | 0, 1 | 0 |
| 5 | 4 | 1 | FD-CDM2 | ($k_0$, $l_0$), ($k_0$, $l_0 + 1$) | 0, 1 | 0 |
| 7 | 8 | 1 | FD-CDM2 | ($k_0$, $l_0$), ($k_1$, $l_0$), ($k_2$, $l_0$), ($k_3$, $l_0$) | 0, 1 | 0 |
| 8 | 8 | 1 | FD-CDM2 | ($k_0$, $l_0$), ($k_1$, $l_0$), ($k_0$, $l_0 + 1$, ($k_1$, $l_0 + 1$) | 0, 1 | 0 |
| 9 | 8 | 1 | CDM4 (FD2, TD2) | ($k_0$, $l_0$), ($k_1$, $l_0$) | 0, 1 | 0, 1 |
| 10 | 12 | 1 | FD-CDM2 | ($k_0$, $l_0$), ($k_1$, $l_0$), ($k_2$, $l_0$), ($k_3$, $l_0$), ($k_4$, $l_0$), ($k_5$, $l_0$) | 0, 1 | 0 |
| 11 | 12 | 1 | CDM4 (FD2, TD2) | ($k_0$, $l_0$), ($k_1$, $l_0$), ($k_2$, $l_0$) | 0, 1 | 0, 1 |
| 12 | 16 | 1, 0.5 | FD-CDM2 | ($k_0$, $l_0$), ($k_1$, $l_0$), ($k_2$, $l_0$), ($k_3$, $l_0$), ($k_0$, $l_0 + 1$), ($k_1$, $l_0 + 1$), ($k_2$, $l_0 + 1$), ($k_3$, $l_0 + 1$) | 0, 1 | 0 |
| 13 | 16 | 1, 0.5 | CDM4 (FD2, TD2) | ($k_0$, $l_0$), ($k_1$, $l_0$), ($k_2$, $l_0$), ($k_3$, $l_0$) | 0, 1 | 0, 1 |
| 14 | 24 | 1, 0.5 | FD-CDM2 | ($k_0$, $l_0$), ($k_1$, $l_0$), ($k_2$, $l_0$), ($k_0$, $l_0 + 1$), ($k_1$, $l_0 + 1$), ($k_2$, $l_0 + 1$), ($k_0$, $l_1$), ($k_1$, $l_1$), ($k_2$, $l_1$), ($k_0$, $l_1 + 1$), ($k_1$, $l_1 + 1$), ($k_2$, $l_1 + 1$) | 0, 1 | 0 |
| 15 | 24 | 1, 0.5 | CDM4 (FD2, TD2) | ($k_0$, $l_0$), ($k_1$, $l_0$), ($k_2$, $l_0$), ($k_0$, $l_1$), ($k_1$, $l_1$), ($k_2$, $l_1$) | 0, 1 | 0, 1 |
| 16 | 24 | 1, 0.5 | CDM8 (FD2, TD4) | ($k_0$, $l_0$), ($k_1$, $l_0$), ($k_2$, $l_0$) | 0, 1 | 0, 1, 2, 3 |
| 17 | 32 | 1, 0.5 | FD-CDM2 | ($k_0$, $l_0$), ($k_1$, $l_0$), ($k_2$, $l_0$), ($k_3$, $l_0$), ($k_0$, $l_0 + 1$), ($k_1$, $l_0 + 1$), ($k_2$, $l_0 + 1$), ($k_3$, $l_0 + 1$), ($k_0$, $l_1$), ($k_1$, $l_1$), ($k_2$, $l_1$), ($k_3$, $l_1$), ($k_0$, $l_1 + 1$), ($k_1$, $l_1 + 1$), ($k_2$, $l_1 + 1$), ($k_3$, $l_1 + 1$) | 0, 1 | 0 |
| 18 | 32 | 1, 0.5 | CDM4 (FD2, TD2) | ($k_0$, $l_0$), ($k_1$, $l_0$), ($k_2$, $l_0$), ($k_3$, $l_0$), ($k_0$, $l_1$), ($k_1$, $l_1$), ($k_2$, $l_1$), ($k_3$, $l_1$) | 0, 1 | 0, 1 |
| 19 | 32 | 1, 0.5 | CDM8 (FD2, TD4) | ($k_0$, $l_0$), ($k_1$, $l_0$), ($k_2$, $l_0$), ($k_3$, $l_0$) | 0, 1 | 0, 1, 2, 3 |

TABLE 2

The sequences $w_f(k')$ and $w_t(l')$ for CDMType equal to 'no CDM'

| Index | $w_f(k')$ | $w_t(l')$ |
|---|---|---|
| 0 | 1 | 1 |

TABLE 3

The sequences $w_f(k')$ and $w_t(l')$ for CDMType equal to 'FD-CDM2'

| Index | $w_f(k')$ | $w_t(l')$ |
|---|---|---|
| 0 | [+1 +1] | 1 |
| 1 | [+1 −1] | 1 |

TABLE 4

The sequences $w_f(k')$ and $w_t(l')$ for CDMType equal to 'CDM4'

| Index | $w_f(k')$ | $w_t(l')$ |
|---|---|---|
| 0 | [+1 +1] | [+1 +1] |
| 1 | [+1 −1] | [+1 +1] |
| 2 | [+1 +1] | [+1 −1] |
| 3 | [+1 −1] | [+1 −1] |

TABLE 5

The sequences $w_f(k')$ and $w_t(l')$ for CDMType equal to 'CDM8'

| Index | $w_f(k')$ | $w_t(l')$ |
|---|---|---|
| 0 | [+1 +1] | [+1 +1 +1 +1] |
| 1 | [+1 −1] | [+1 +1 +1 +1] |
| 2 | [+1 +1] | [+1 −1 +1 −1] |
| 3 | [+1 −1] | [+1 −1 +1 −1] |
| 4 | [+1 +1] | [+1 +1 −1 −1] |
| 5 | [+1 −1] | [+1 +1 −1 −1] |
| 6 | [+1 +1] | [+1 −1 −1 +1] |
| 7 | [+1 −1] | [+1 −1 −1 +1] |

Figure 2:
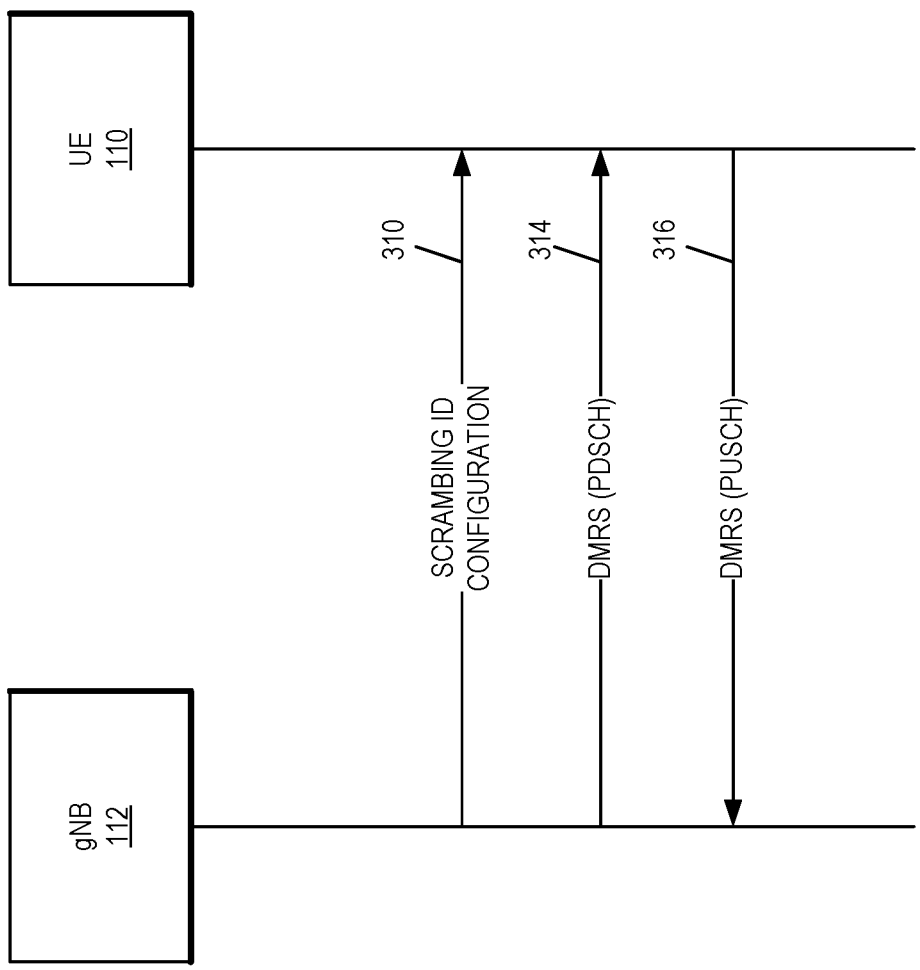
FIG. 2 is a diagram of process of scrambling ID configuration for demodulation reference signals (DMRS) in accordance with one or more embodiments.

Referring now to FIG. 2, a flow diagram of process of scrambling ID configuration for demodulation reference signals (DMRS) in accordance with one or more embodiments will be discussed. As shown in FIG. 2, flow diagram illustrates the signaling the choice of configured scrambling identifier (ID) to the user with the following two options. In a first option, the choice of scrambling ID is configured by transmitting a scrambling ID configuration 310 from gNB 112 to UE 110 using transmission configuration indication (TCI) states as part of a synchronization signal block (SSB) or as part of channel state information reference signal (CSI-RS) configuration. In a second option, the choice of scrambling ID is configured by transmitting a scrambling ID configuration 310 from gNB 112 to UE 110 using explicit downlink control information (DCI) signaling to select one of the scrambling IDs. The selected scrambling ID can then be used to transmit DMRS signals in the physical downlink shared channel (PDSCH) 314 and physical uplink shared channel (PUSCH) 316 for example for data demodulation.

DMRS Generation

For New Radio (NR) Release 15 demodulation reference signal (DMRS) design, it was agreed in RAN1#91 that the DMRS would be generated using a length-31 pseudo-random sequence. Pseudo-random sequences are defined by a length-31 Gold sequence. The output sequence $c(n)$ of length $M_{PN}$, where $n=0, 1, \ldots, M_{PN}$ is defined by $$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

where $N_C = 1600$ and the first m-sequence shall be initialized with $x_1(0) = 1$, $x_1(n) = 0$, $n = 1, 2, \ldots, 30$. The initialization of the second m-sequence is denoted by $c_{init}$ with the value given as follows:

$$c_{init} = (2^{17} \cdot (14 n_s + l + 1) \cdot (2 N_{ID}^{nSCID} + 1) + 2 N_{ID}^{nSCID} + n_{SCID}) \bmod 2^{31}$$

where $n_s$ is the slot index in the radio frame, $l$ is the OFDM symbol index and $N_{ID}^{nSCID}$ is the 16-bit scrambling ID given by the higher layer parameter UL-DMRS-Scrambling-ID or DL-DMRS-Scrambling-ID for uplink and downlink respectively. The scrambling is indexed by the 1-bit value $n_{SCID} \in \{0,1\}$ which is to be signaled to the user for determining the configured scrambling ID.

Signaling Scrambling ID

In one embodiment, $n_{SCID}$ can be configured in the CSI-RS configuration. In another embodiment, $n_{SCID}$ can be configured in the SS-Block. In both embodiments, the actual value of $n_{SCID}$ can be signaled using transmission configuration information (TCI) states if the higher layer parameter TCI-PresentInDCI is "enabled". In this case, the TCI state is signaled using 3-bits in the DCI of the ControlResourceSet (CORESET) scheduling the PDSCH/PUSCH. The value of $n_{SCID}$ can be associated with a TCI state which is associated with CSI-RS or SS-Block configuration.

In another embodiment when the higher layer parameter TCI-PresentInDCI is "disabled", there are no TCI bits associated with the DCI. In this case, the default value of $n_{SCID}$ can be set to 0. In yet another embodiment, the value of $n_{SCID} \in \{0,1\}$ can be signaled to the user using 1-bit in the DCI associated with the CORESET scheduling the PDSCH/PUSCH for the user.

Section 7.4.1.1.1 of 3GPP TS 38.211 V15.2.0 (2018-06) illustrates an example of sequence generation of DMRS signals for the PDSCH as follows.

7.4.1.1.1 Sequence Generation

The UE shall assume the sequence $r(n)$ is defined by $$r(n) = \frac{1}{\sqrt{2}}(1 - 2 \cdot c(2n)) + j \frac{1}{\sqrt{2}}(1 - 2 \cdot c(2n+1)).$$

where the pseudo-random sequence $c(i)$ is defined in clause 5.2.1. The pseudo-random sequence generator shall be initialized with $$c_{init} = (2^{17}(N_{symb}^{slot} n_{s,f}^{\mu} + l + 1)(2 N_{ID}^{nSCID} + 1) + 2 N_{ID}^{nSCID} + n_{SCID}) \bmod 2^{31}$$

where $l$ is the OFDM symbol number within the slot, $n_{s,f}^{\mu}$ is the slot number within a frame, and $N_{ID}^0, N_{ID}^1 \in \{0, 1, \ldots, 65535\}$ are given by the higher-layer parameters scramblingID0 and scramblingID1, respectively, in the DMRS-DownlinkConfig IE if provided and the PDSCH is scheduled by PDCCH using DCI format 1_1 with the CRC scrambled by C-RNTI or CS-RNTI;

$N_{ID}^0 \in \{0, 1, \ldots, 65535\}$ is given by the higher-layer parameter scramblingID0 in the DMRS-DownlinkConfig IE if provided and the PDSCH is scheduled by PDCCH using DCI format 1_0 with the CRC scrambled by C-RNTI or CS-RNTI;

$N_{ID}^{nSCID} = N_{ID}^{cell}$ otherwise;

The quantity $n_{SCID} \in \{0, 1\}$ is given by the DM-RS sequence initialization field, if present, in the DCI associated with the PDSCH transmission if DCI format 1_1 in [4, TS 38.212] is used, otherwise $n_{SCID} = 0$.

Figure 3:
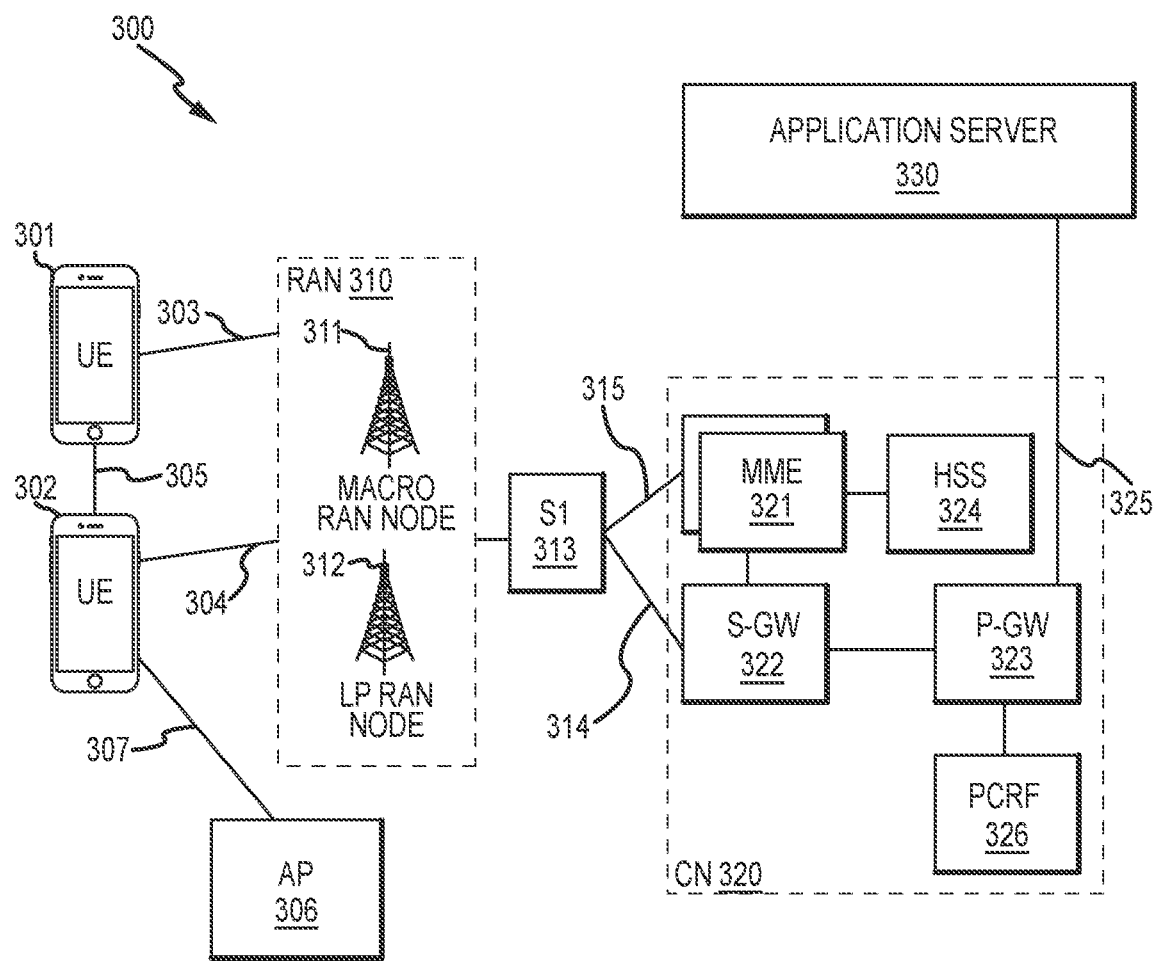
FIG. 3 illustrates an architecture of a system of a network in accordance with some embodiments.

FIG. 3 illustrates an architecture of a system of a network in accordance with some embodiments. The system 300 is shown to include a user equipment (UE) 301 and a UE 302. The UEs 301 and 302 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 301 and 302 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 301 and 302 may be configured to connect, e.g., communicatively couple, with a radio access network (RAN) 310—the RAN 310 may be, for example, an Evolved Universal Mobile Telecommunications System (UMTS) Terrestrial Radio Access Network (E-UTRAN), a NextGen RAN (NG RAN), or some other type of RAN. The UEs 301 and 302 utilize connections 303 and 304, respectively, each of which comprises a physical communications interface or layer (discussed in further detail below); in this example, the connections 303 and 304 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 301 and 302 may further directly exchange communication data via a ProSe interface 305. The ProSe interface 305 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 302 is shown to be configured to access an access point (AP) 306 via connection 307. The connection 307 can comprise a local wireless connection, such as a connection consistent with any IEEE 802.11 protocol, wherein the AP 306 would comprise a wireless fidelity (WiFi®) router. In this example, the AP 306 is shown to be connected to the Internet without connecting to the core network of the wireless system (described in further detail below).

The RAN 310 can include one or more access nodes that enable the connections 303 and 304. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 310 may include one or more RAN nodes for providing macrocells, e.g., macro RAN node 311, and one or more RAN nodes for providing femtocells or picocells (e.g., cells having smaller coverage areas, smaller user capacity, or higher bandwidth compared to macrocells), e.g., low power (LP) RAN node 312.

Any of the RAN nodes 311 and 312 can terminate the air interface protocol and can be the first point of contact for the UEs 301 and 302. In some embodiments, any of the RAN nodes 311 and 312 can fulfill various logical functions for the RAN 310 including, but not limited to, radio network controller (RNC) functions such as radio bearer management, uplink and downlink dynamic radio resource management and data packet scheduling, and mobility management.

In accordance with some embodiments, the UEs 301 and 302 can be configured to communicate using Orthogonal Frequency-Division Multiplexing (OFDM) communication signals with each other or with any of the RAN nodes 311 and 312 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 311 and 312 to the UEs 301 and 302, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 301 and 302. The physical downlink control channel (PDCCH) may carry information about the transport format and resource allocations related to the PDSCH channel, among other things. It may also inform the UEs 301 and 302 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 311 and 312 based on channel quality information fed back from any of the UEs 301 and 302. The downlink resource assignment information may be sent on the PDCCH used for (e.g., assigned to) each of the UEs 301 and 302.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 310 is shown to be communicatively coupled to a core network (CN) 320—via an S1 interface 313. In embodiments, the CN 320 may be an evolved packet core (EPC) network, a NextGen Packet Core (NPC) network, or some other type of CN. In this embodiment the S1 interface 313 is split into two parts: the S1-U interface 314, which carries traffic data between the RAN nodes 311 and 312 and the serving gateway (S-GW) 322, and the S1-mobility management entity (MME) interface 315, which is a signaling interface between the RAN nodes 311 and 312 and MMEs 321.

In this embodiment, the CN 320 comprises the MMEs 321, the S-GW 322, the Packet Data Network (PDN) Gateway (P-GW) 323, and a home subscriber server (HSS) 324. The MMEs 321 may be similar in function to the control plane of legacy Serving General Packet Radio Service (GPRS) Support Nodes (SGSN). The MMEs 321 may manage mobility aspects in access such as gateway selection and tracking area list management. The HSS 324 may comprise a database for network users, including subscription-related information to support the network entities' handling of communication sessions. The CN 320 may comprise one or several HSSs 324, depending on the number of mobile subscribers, on the capacity of the equipment, on the organization of the network, etc. For example, the HSS 324 can provide support for routing/roaming, authentication, authorization, naming/addressing resolution, location dependencies, etc.

The S-GW 322 may terminate the S1 interface 313 towards the RAN 310, and routes data packets between the RAN 310 and the CN 320. In addition, the S-GW 322 may be a local mobility anchor point for inter-RAN node handovers and also may provide an anchor for inter-3GPP mobility. Other responsibilities may include lawful intercept, charging, and some policy enforcement.

The P-GW 323 may terminate an SGi interface toward a PDN. The P-GW 323 may route data packets between the EPC network 323 and external networks such as a network including the application server 330 (alternatively referred to as application function (AF)) via an Internet Protocol (IP) interface 325. Generally, the application server 330 may be an element offering applications that use IP bearer resources with the core network (e.g., UMTS Packet Services (PS) domain, LTE PS data services, etc.). In this embodiment, the P-GW 323 is shown to be communicatively coupled to an application server 330 via an IP communications interface 325. The application server 330 can also be configured to support one or more communication services (e.g., Voice-over-Internet Protocol (VoIP) sessions, PTT sessions, group communication sessions, social networking services, etc.) for the UEs 301 and 302 via the CN 320.

The P-GW 323 may further be a node for policy enforcement and charging data collection. Policy and Charging Enforcement Function (PCRF) 326 is the policy and charging control element of the CN 320. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 326 may be communicatively coupled to the application server 330 via the P-GW 323. The application server 330 may signal the PCRF 326 to indicate a new service flow and select the appropriate Quality of Service (QoS) and charging parameters. The PCRF 326 may provision this rule into a Policy and Charging Enforcement Function (PCEF) (not shown) with the appropriate traffic flow template (TFT) and QoS class of identifier (QCI), which commences the QoS and charging as specified by the application server 330.

Figure 4:
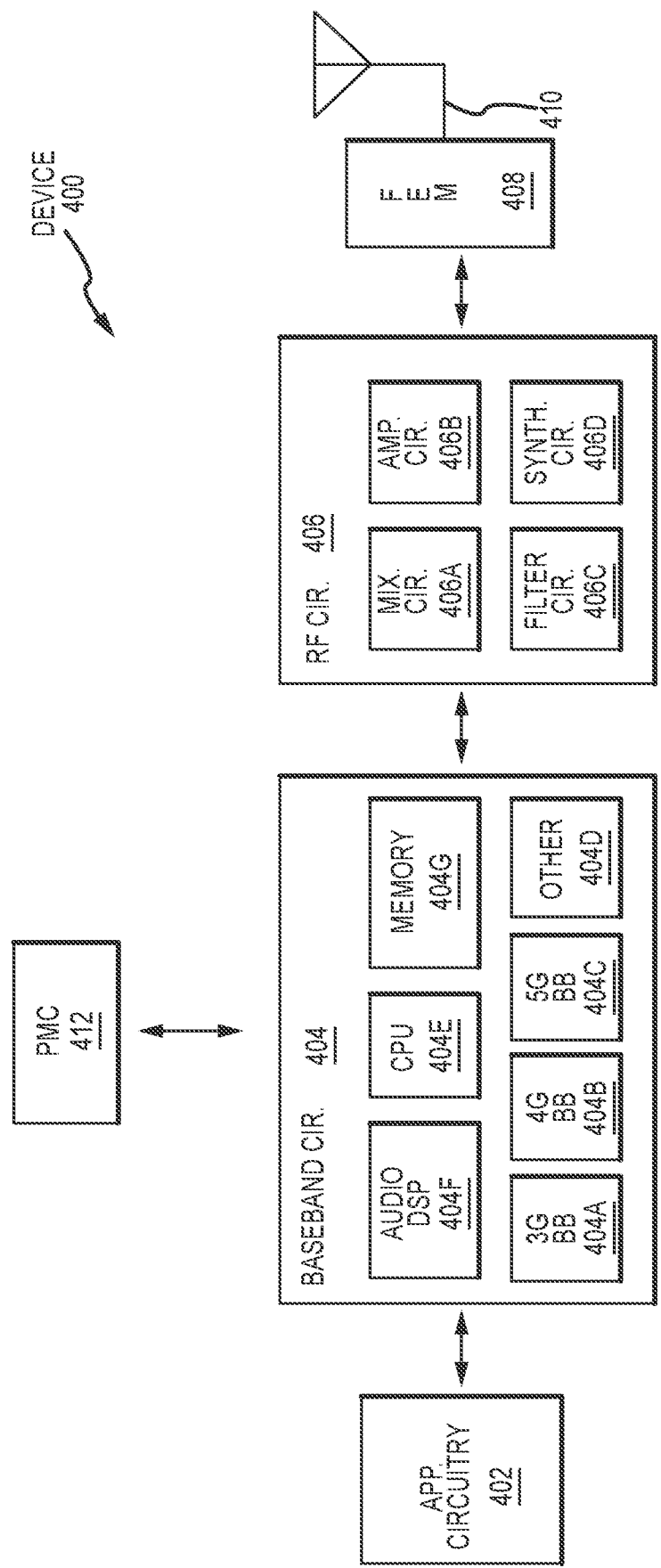
FIG. 4 illustrates example components of a device in accordance with some embodiments.

FIG. 4 illustrates example components of a device in accordance with some embodiments. In some embodiments, the device 400 may include application circuitry 402, baseband circuitry 404, Radio Frequency (RF) circuitry 406, front-end module (FEM) circuitry 408, one or more antennas 410, and power management circuitry (PMC) 412 coupled together at least as shown. The components of the illustrated device 400 may be included in a UE or a RAN node. In some embodiments, the device 400 may include less elements (e.g., a RAN node may not utilize application circuitry 402, and instead include a processor/controller to process IP data received from an EPC). In some embodiments, the device 400 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 402 may include one or more application processors. For example, the application circuitry 402 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 400. In some embodiments, processors of application circuitry 402 may process IP data packets received from an EPC.

The baseband circuitry 404 may include circuitry such as, but not limited to, one or more single-core or multi-core processors. The baseband circuitry 404 may include one or more baseband processors or control logic to process baseband signals received from a receive signal path of the RF circuitry 406 and to generate baseband signals for a transmit signal path of the RF circuitry 406. Baseband processing circuitry 404 may interface with the application circuitry 402 for generation and processing of the baseband signals and for controlling operations of the RF circuitry 406. For example, in some embodiments, the baseband circuitry 404 may include a third generation (3G) baseband processor 404A, a fourth generation (4G) baseband processor 404B, a fifth generation (5G) baseband processor 404C, or other baseband processor(s) 404D for other existing generations, generations in development or to be developed in the future (e.g., second generation (2G), sixth generation (6G), etc.). The baseband circuitry 404 (e.g., one or more of baseband processors 404A-D) may handle various radio control functions that enable communication with one or more radio networks via the RF circuitry 406. In other embodiments, some or all of the functionality of baseband processors 404A-D may be included in modules stored in the memory 404G and executed via a Central Processing Unit (CPU) 404E. The radio control functions may include, but are not limited to, signal modulation/demodulation, encoding/decoding, radio frequency shifting, etc. In some embodiments, modulation/demodulation circuitry of the baseband circuitry 404 may include Fast-Fourier Transform (FFT), precoding, or constellation mapping/demapping functionality. In some embodiments, encoding/decoding circuitry of the baseband circuitry 404 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 404 may include one or more audio digital signal processor(s) (DSP) 404F. The audio DSP(s) 404F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 404 and the application circuitry 402 may be implemented together such as, for example, on a system on a chip (SOC).

In some embodiments, the baseband circuitry 404 may provide for communication compatible with one or more radio technologies. For example, in some embodiments, the baseband circuitry 404 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 404 is configured to support radio communications of more than one wireless protocol may be referred to as multi-mode baseband circuitry.

RF circuitry 406 may enable communication with wireless networks using modulated electromagnetic radiation through a non-solid medium. In various embodiments, the RF circuitry 406 may include switches, filters, amplifiers, etc. to facilitate the communication with the wireless network. RF circuitry 406 may include a receive signal path which may include circuitry to down-convert RF signals received from the FEM circuitry 408 and provide baseband signals to the baseband circuitry 404. RF circuitry 406 may also include a transmit signal path which may include circuitry to up-convert baseband signals provided by the baseband circuitry 404 and provide RF output signals to the FEM circuitry 408 for transmission.

In some embodiments, the receive signal path of the RF circuitry 406 may include mixer circuitry 406a, amplifier circuitry 406b and filter circuitry 406c. In some embodiments, the transmit signal path of the RF circuitry 406 may include filter circuitry 406c and mixer circuitry 406a. RF circuitry 406 may also include synthesizer circuitry 406d for synthesizing a frequency for use by the mixer circuitry 406a of the receive signal path and the transmit signal path. In some embodiments, the mixer circuitry 406a of the receive signal path may be configured to down-convert RF signals received from the FEM circuitry 408 based on the synthesized frequency provided by synthesizer circuitry 406d. The amplifier circuitry 406b may be configured to amplify the down-converted signals and the filter circuitry 406c may be a low-pass filter (LPF) or band-pass filter (BPF) configured to remove unwanted signals from the down-converted signals to generate output baseband signals. Output baseband signals may be provided to the baseband circuitry 404 for further processing. In some embodiments, the output baseband signals may be zero-frequency baseband signals, although this is not a requirement. In some embodiments, mixer circuitry 406a of the receive signal path may comprise passive mixers, although the scope of the embodiments is not limited in this respect.

In some embodiments, the mixer circuitry 406a of the transmit signal path may be configured to up-convert input baseband signals based on the synthesized frequency provided by the synthesizer circuitry 406d to generate RF output signals for the FEM circuitry 408. The baseband signals may be provided by the baseband circuitry 404 and may be filtered by filter circuitry 406c.

In some embodiments, the mixer circuitry 406a of the receive signal path and the mixer circuitry 406a of the transmit signal path may include two or more mixers and may be arranged for quadrature downconversion and upconversion, respectively. In some embodiments, the mixer circuitry 406a of the receive signal path and the mixer circuitry 406a of the transmit signal path may include two or more mixers and may be arranged for image rejection (e.g., Hartley image rejection). In some embodiments, the mixer circuitry 406a of the receive signal path and the mixer circuitry 406a may be arranged for direct downconversion and direct upconversion, respectively. In some embodiments, the mixer circuitry 406a of the receive signal path and the mixer circuitry 406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 406 may include analog-to-digital converter (ADC) and digital-to-analog converter (DAC) circuitry and the baseband circuitry 404 may include a digital baseband interface to communicate with the RF circuitry 406. In some dual-mode embodiments, a separate radio IC circuitry may be provided for processing signals for each spectrum, although the scope of the embodiments is not limited in this respect.

In some embodiments, the synthesizer circuitry 406d may be a fractional-N synthesizer or a fractional N/N+1 synthesizer, although the scope of the embodiments is not limited in this respect as other types of frequency synthesizers may be suitable. For example, synthesizer circuitry 406d may be a delta-sigma synthesizer, a frequency multiplier, or a synthesizer comprising a phase-locked loop with a frequency divider.

The synthesizer circuitry 406d may be configured to synthesize an output frequency for use by the mixer circuitry 406a of the RF circuitry 406 based on a frequency input and a divider control input. In some embodiments, the synthesizer circuitry 406d may be a fractional N/N+1 synthesizer.

In some embodiments, frequency input may be provided by a voltage-controlled oscillator (VCO), although that is not a requirement. Divider control input may be provided by either the baseband circuitry 404 or the applications processor 402 depending on the desired output frequency. In some embodiments, a divider control input (e.g., N) may be determined from a look-up table based on a channel indicated by the applications processor 402.

Synthesizer circuitry 406d of the RF circuitry 406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 406 may include an IQ/polar converter.

FEM circuitry 408 may include a receive signal path which may include circuitry configured to operate on RF signals received from one or more antennas 410, amplify the received signals and provide the amplified versions of the received signals to the RF circuitry 406 for further processing. FEM circuitry 408 may also include a transmit signal path which may include circuitry configured to amplify signals for transmission provided by the RF circuitry 406 for transmission by one or more of the one or more antennas 410. In various embodiments, the amplification through the transmit or receive signal paths may be done solely in the RF circuitry 406, solely in the FEM 408, or in both the RF circuitry 406 and the FEM 408.

In some embodiments, the FEM circuitry 408 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 406). The transmit signal path of the FEM circuitry 408 may include a power amplifier (PA) to amplify input RF signals (e.g., provided by RF circuitry 406), and one or more filters to generate RF signals for subsequent transmission (e.g., by one or more of the one or more antennas 410).

In some embodiments, the PMC 412 may manage power provided to the baseband circuitry 404. In particular, the PMC 412 may control power-source selection, voltage scaling, battery charging, or DC-to-DC conversion. The PMC 412 may often be included when the device 400 is capable of being powered by a battery, for example, when the device is included in a UE. The PMC 412 may increase the power conversion efficiency while providing desirable implementation size and heat dissipation characteristics.

While FIG. 4 shows the PMC 412 coupled only with the baseband circuitry 404. However, in other embodiments, the PMC 412 may be additionally or alternatively coupled with, and perform similar power management operations for, other components such as, but not limited to, application circuitry 402, RF circuitry 406, or FEM 408.

In some embodiments, the PMC 412 may control, or otherwise be part of, various power saving mechanisms of the device 400. For example, if the device 400 is in an RRC_Connected state, where it is still connected to the RAN node as it expects to receive traffic shortly, then it may enter a state known as Discontinuous Reception Mode (DRX) after a period of inactivity. During this state, the device 400 may power down for brief intervals of time and thus save power.

If there is no data traffic activity for an extended period of time, then the device 400 may transition off to an RRC_Idle state, where it disconnects from the network and does not perform operations such as channel quality feedback, handover, etc. The device 400 goes into a very low power state and it performs paging where again it periodically wakes up to listen to the network and then powers down again. The device 400 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 402 and processors of the baseband circuitry 404 may be used to execute elements of one or more instances of a protocol stack. For example, processors of the baseband circuitry 404, alone or in combination, may be used execute Layer 3, Layer 2, or Layer 1 functionality, while processors of the application circuitry 404 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 5:
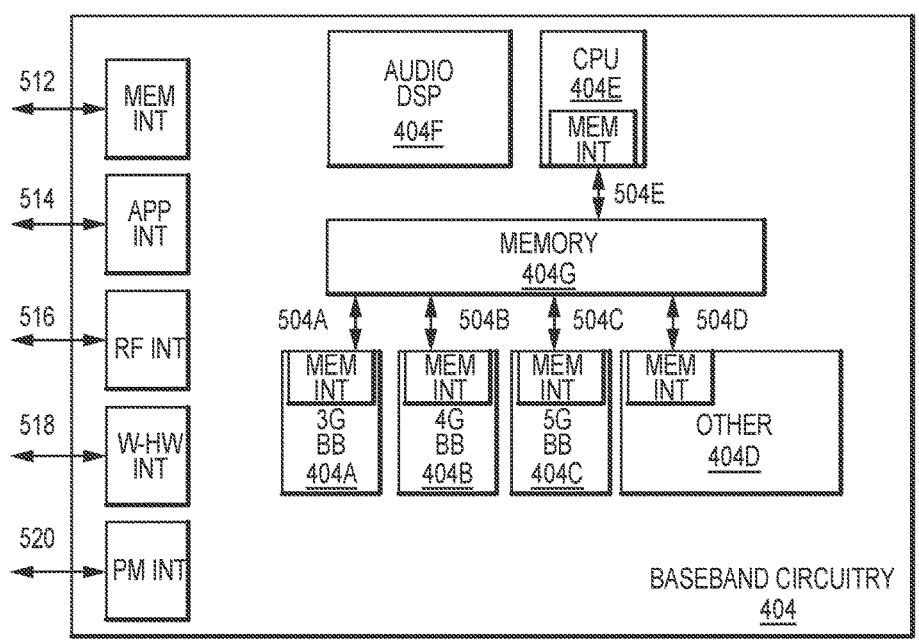
FIG. 5 illustrates example interfaces of baseband circuitry in accordance with some embodiments.

FIG. 5 illustrates example interfaces of baseband circuitry in accordance with some embodiments. As discussed above, the baseband circuitry 404 of FIG. 4 may comprise processors 404A-404E and a memory 404G utilized by said processors. Each of the processors 404A-404E may include a memory interface, 504A-504E, respectively, to send/receive data to/from the memory 404G.

The baseband circuitry 404 may further include one or more interfaces to communicatively couple to other circuitries/devices, such as a memory interface 512 (e.g., an interface to send/receive data to/from memory external to the baseband circuitry 404), an application circuitry interface 514 (e.g., an interface to send/receive data to/from the application circuitry 402 of FIG. 4), an RF circuitry interface 516 (e.g., an interface to send/receive data to/from RF circuitry 406 of FIG. 4), a wireless hardware connectivity interface 518 (e.g., an interface to send/receive data to/from Near Field Communication (NFC) components, Bluetooth® components (e.g., Bluetooth® Low Energy), Wi-Fi® components, and other communication components), and a power management interface 520 (e.g., an interface to send/receive power or control signals to/from the PMC 412.

In the description herein and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. Coupled, however, may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. It should be noted, however, that "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the description herein and/or claims, the terms "comprise" and "include," along with their derivatives, may be used and are intended as synonyms for each other.

Although the claimed subject matter has been described with a certain degree of particularity, it should be recognized that elements thereof may be altered by persons skilled in the art without departing from the spirit and/or scope of claimed subject matter. It is believed that the subject matter pertaining to CSI-RS sequence generation and mapping and DMRS scrambling ID configuration and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of a Fifth Generation (5G) NodeB (gNB), comprising:
   one or more baseband processors to encode a scrambling identity (ID) configuration for one or more demodulation reference signals (DMRS), wherein the scrambling ID configuration indicates one of two scrambling IDs to be signaled to a user equipment (UE); and
   a transmitter to transmit the scrambling ID configuration to the UE, wherein the scrambling ID configuration is transmitted to the UE using transmission configuration indication (TCI) states.

2. The apparatus of claim 1, wherein the one or more baseband processors encode the one or more DMRS using, at least, a selected one of the two scrambling IDs and the transmitter transmits the one or more DMRS in the physical downlink shared channel (PDSCH).

3. The apparatus of claim 1, further comprising:
   a receiver to receive one or more DMRS on a physical uplink shared channel (PUSCH) from the UE, wherein the one or more baseband processors decode the received one or more DMRS using, at least, a selected one of the two scrambling IDs.

4. The apparatus of claim 1, wherein the transmitter transmits downlink control information (DCI) to the UE, the DCI indicating that the scrambling ID is to be signaled using the TCI states.

5. The apparatus of claim 1, wherein the TCI states are part of a signal synchronization block (SSB).

6. The apparatus of claim 1, wherein the TCI states are part of a channel state information reference signal (CSI-RS).

7. One or more non-transitory storage media having instructions stored thereon that, when executed by an apparatus of a Fifth Generation (5G) NodeB (gNB), result in:
   encoding a scrambling identity (ID) configuration for one or more demodulation reference signals (DMRS), wherein the scrambling ID configuration indicates one of two scrambling IDs to be signaled to a user equipment (UE); and
   transmitting the scrambling ID configuration to the UE, wherein the scrambling ID configuration is transmitted to the UE using transmission configuration indication (TCI) states.

8. The One or more non-transitory storage media of claim 7, further resulting in:
   encoding the one or more DMRS using, at least, a selected one of the two scrambling IDs; and
   transmitting the one or more DMRS in the physical downlink shared channel (PDSCH).

9. The One or more non-transitory storage media of claim 7, further resulting in:
   receiving one or more DMRS on a physical uplink shared channel (PUSCH) from the UE; and
   decoding the received one or more DMRS using, at least, a selected one of the two scrambling IDs.

10. The one or more non-transitory storage of claim 7, wherein the transmitter transmits downlink control information (DCI) to the UE, the DCI indicating that the scrambling ID is to be signaled using the TCI states.

11. The one or more non-transitory storage of claim 7, wherein the TCI states are part of a signal synchronization block (SSB).

12. The one or more non-transitory storage of claim 7, wherein the TCI states are part of a channel state information reference signal (CSI-RS).

13. An apparatus of a user equipment (UE), comprising:
    a receiver to receive scrambling identity (ID) configuration from a Fifth Generation (5G) NodeB (gNB); and
    one or more baseband processors to decode the scrambling ID configuration for one or more demodulation reference signals (DMRS), wherein the scrambling ID configuration indicates one of two scrambling IDs to be signaled to the user equipment (UE) and wherein the scrambling ID configuration is transmitted to the UE using transmission configuration indication (TCI) states.

14. The apparatus of claim 13, wherein the receiver receives the one or more DMRS in the physical downlink shared channel (PDSCH) and the one or more baseband processors decode the one or more DMRS using, at least, a selected one of the two scrambling IDs.

15. The apparatus of claim 13, wherein the one or more baseband processors decode one or more DMRS using, at least, a selected one of the two scrambling IDs, the apparatus further comprising:
    a transmitter to transmit the one or more DMRS on a physical uplink shared channel (PUSCH) to the gNB.

16. The apparatus of claim 13, wherein the receiver receives downlink control information (DCI) indicating that the scrambling ID is to be signaled using the TCI states.

17. The apparatus of claim 13, wherein the TCI states are part of a signal synchronization block (SSB).

18. The apparatus of claim 13, wherein the TCI states are part of a channel state information reference signal (CSI-RS).

\* \* \* \* \*